No. 671,608. Patented Apr. 9, 1901.
O. P. OSTERGREN.
LIQUEFIED AIR MOTOR.
(Application filed Feb. 13, 1899.)
(No Model.)
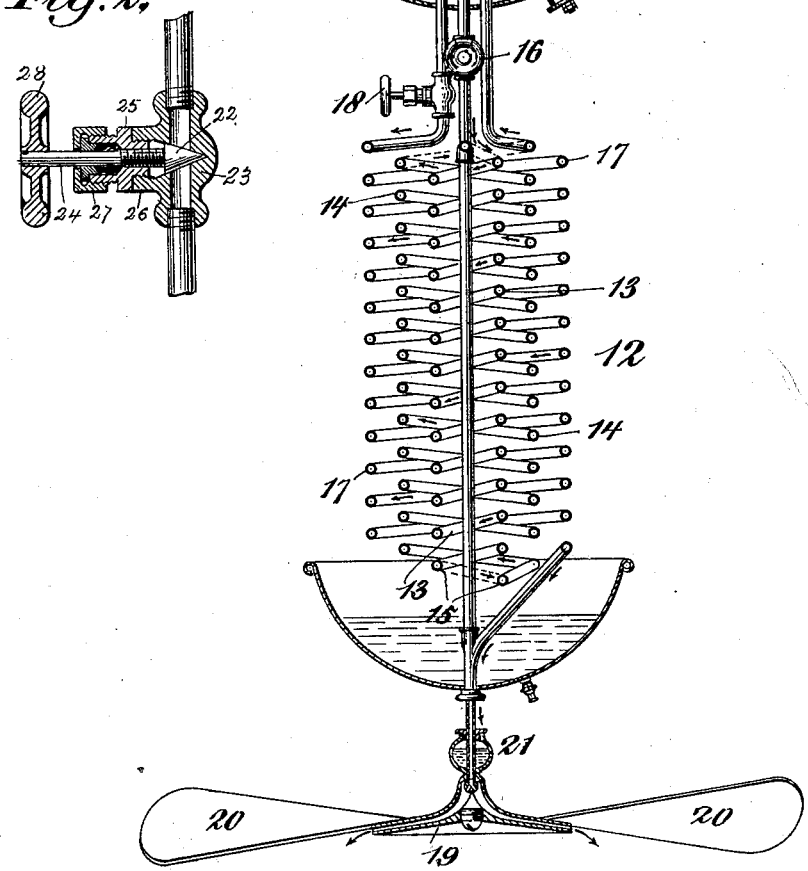
Fig. 1.
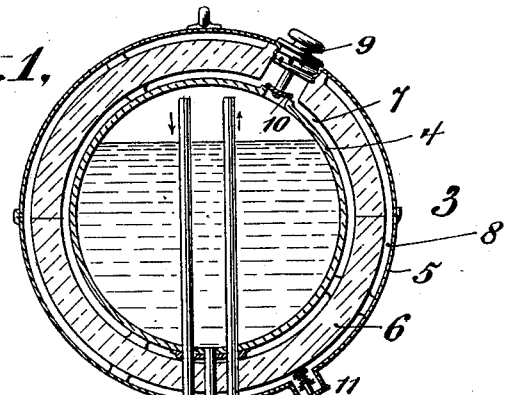
Fig. 2.
Fig. 3.
WITNESSES:
INVENTOR
Oscar Patric Ostergren
BY
James E. Chapin
His ATTORNEY

UNITED STATES PATENT OFFICE.

OSCAR PATRIC OSTERGREN, OF BROOKLYN, NEW YORK, ASSIGNOR TO THE GENERAL LIQUID AIR AND REFRIGERATING COMPANY, OF NEW JERSEY.

LIQUEFIED-AIR MOTOR.

SPECIFICATION forming part of Letters Patent No. 671,608, dated April 9, 1901.

Application filed February 13, 1899. Serial No. 705,427. (No model.)

*To all whom it may concern:*

Be it known that I, OSCAR PATRIC OSTERGREN, a citizen of the Kingdom of Sweden, and a resident of Brooklyn, Kings county, New York, have invented certain new and useful Improvements in Liquefied-Air Motors, of which the following is a specification.

My invention relates to improvements in liquefied-air motors, and particularly to the use of same in connection with rotating fan-blades.

My invention consists of the provision of a novel and efficient form of vaporizer used in connection with a reservoir for containing the liquefied air or other fluid employed, in the provision of suitable means for utilizing the vaporized gas or air for a motive fluid, in the combination of these elements with fan-blades, and in providing a discharge-opening for the vaporized gas or air after it has passed the motor in advance of the fan-blades.

The objects of my invention are the practical utilization of liquefied air or other gas as a motive fluid, particularly for operating a rotary fan, and the utilization of the discharged cold air for cooling purposes, in combination with the said rotary fan.

I will now proceed to describe a device embodying my invention and will then point out the novel features in claims.

Figure 1 represents a central vertical section of a reservoir, a vaporizer, an air-motor, and fan-blades constituting my invention. Figs. 2 and 3 are details.

Similar reference characters designate corresponding parts in all the figures.

Reference-numeral 3 designates a receptacle or reservoir containing the liquefied air or other gas employed. This reservoir may be of any desired form and may be protected from the heat of the atmosphere by any desired means. In this reservoir, 4 designates an interior vessel and 5 an exterior vessel. A casing 6, of porous material, such as porous carbon, is arranged between the two vessels, as shown, but is of such dimensions and is so arranged as to leave a space 7 between the said casing and the interior vessel and a space 8 between the said casing and the exterior vessel.

9 designates a filling-plug, and 10 a check-valve.

When vaporization takes place within the interior vessel and the vapor is not drawn off for any other purpose, the said vapor lifts the check-valve 10 and passes into the space 7. From thence it percolates through the porous casing 6 and tends to hold back the warmer air in the space 8, which has become heated by its contact with the exterior vessel 5, which derives its heat from the heat of the atmosphere.

11 designates a blow-off valve set to blow off at any predetermined pressure—such, for instance, at two pounds per square inch above atmospheric pressure.

12 designates a vaporizer, here shown as comprising a coil 13, which is connected at one of its ends with the interior of the interior vessel 4 of the reservoir 3 at a point below the level of the liquid therein, preferably at the lowest point thereof, and a return-coil 14, connected with the interior vessel 4 at a point above the level of the liquid therein. The lower ends of the two are connected together, as shown at 15, and the coil 13 is provided with a stop-valve 16. The form of valve preferably used is shown in detail in Fig. 2 and comprises a shell or valve-casing, a screw-threaded valve-stem and hand-wheel, and a conical valve secured thereto. The valve-stem is suitably packed, as shown.

17 designates a third coil which is connected to the upper end of the return-coil 14, or, as shown, to the interior of the reservoir at a point above the level of the liquid. The coil 17 is also provided with a stop-valve 18, similar to the valve 16 in the coil 13. The detail view Fig. 2 shows the preferred form of these valves; but such construction is not essential. In this figure, 22 is a cone-shaped valve and 23 its seat. This valve has a stem 24, which is screw-threaded to turn in the interior thread of plug 25, which in its turn is screw-threaded to screw in the coupling 26. At its upper end plug 25 is also screw-threaded to receive the cap 27, which forms a stuffing-box about the valve-stem 24. The valve-stem has a handle 28, which can be turned to move it to and from its seat. The lower end of the coil 17 connects with an air or gas motor, here shown as a turbine 19. (See also detail Fig. 3.)

20 20 designate fan-blades rotated by the action of the turbine 19. The discharge or exhaust from the turbine is arranged in advance of the fan-blades, as shown, so that the said fan-blades in their rotation will drive the cold air so discharged downwardly, and thus circulate same and use same for cooling purposes.

The action of the apparatus is as follows: Valves 16 18 being open, liquid air, by gravity, will pass down the coil 13 and will start to vaporize by absorbing heat from the atmosphere. The products of such vaporization will rise up the return-coil 14 back into the upper end of the interior vessel 4. From thence they will pass down the third coil 17 into the turbine-channels 19. The turbine will thus be rotated and is arranged to carry the fan-blades with it. The cold exhaust-air is discharged in advance of the fan-blades and is thus used for cooling purposes.

21 designates a suitable lubricating device.

Should the pressure in the vaporizer become too high or should the valve 16 be accidentally opened and the valve 18 kept closed, the blow-off valve 11 will act as a safety-valve.

What I claim is—

1. The combination with a reservoir for containing liquefied air or other gas of a coil connected at one of its ends with the reservoir below the level of the liquid therein, a return-coil parallel with the first coil, the two said coils being connected together at their lower ends, an air or gas operated motor, in communication with the upper end of said return-coil, substantially as specified.

2. The combination with a reservoir for containing liquefied air or other gas, of a coil connected at one of its ends with the reservoir below the level of the liquid therein and at the other of its ends with the reservoir above the level of the liquid therein, of an air or gas operated motor, and a connection between said motor and the said reservoir above the level of the liquid therein, substantially as specified.

3. The combination with a reservoir for containing liquefied air or other gas, of three coils arranged below the said reservoir, one of said coils connected with the said reservoir below the level of the liquid therein, the other two of said coils connected with the said reservoir above the level of the liquid therein, the first mentioned of said coils connected at its lower end with the lower end of one of the said second-mentioned coils, and an air or gas operated motor with which the lower end of the other of said second-mentioned coils is connected, substantially as specified.

4. The combination with a reservoir for containing liquefied air or other gas, of three coils arranged below the said reservoir, one of said coils connected with the said reservoir below the level of the liquid therein, the other two of said coils connected with the said reservoir above the level of the liquid therein, the first mentioned of said coils connected at its lower end with the lower end of one of the said second-mentioned coils, a turbine with which the lower end of the other of said second-mentioned coils is connected, fan-blades secured to said turbine and a discharge for said turbine in advance of said fan-blades substantially as specified.

Signed by me at New York, N. Y., this 10th day of February, 1899.

OSCAR PATRIC OSTERGREN.

Witnesses:
JNO. S. PARKER,
CHARLOTTE F. CARRINGTON.